United States Patent [19]

Lamort

[11] 4,200,537
[45] Apr. 29, 1980

[54] APPARATUS FOR THE PURIFICATION OF PAPER PULP

[75] Inventor: Jean P. J. Lamort, Saint Limier en Champagne, France

[73] Assignee: E. et M. Lamort, Vitry Le Francois, France

[21] Appl. No.: 957,928

[22] Filed: Nov. 6, 1978

[30] Foreign Application Priority Data

Nov. 23, 1977 [FR] France .............................. 77 35151

[51] Int. Cl.² .................... B01D 29/38; B07B 1/20
[52] U.S. Cl. ................................. 210/415; 209/242; 209/273; 209/379
[58] Field of Search ............. 209/240, 242, 250, 270, 209/273, 300, 305, 306, 379, 397; 210/407, 413–415

[56] References Cited

U.S. PATENT DOCUMENTS

| | | | |
|---|---|---|---|
| 1,694,498 | 12/1928 | Bruton | 209/397 |
| 3,363,759 | 1/1968 | Clarke-Pounder | 209/273 |
| 3,964,996 | 6/1976 | Holz et al. | 209/273 X |

Primary Examiner—William A. Cuchlinski, Jr.
Attorney, Agent, or Firm—Darby & Darby

[57] ABSTRACT

An apparatus for purifying paper pulp in the liquid state by screening. The apparatus comprising a cylindrical fixed screen disposed coaxially with a rotor within a housing. The rotor has longitudinal blades which, in section transverse to the rotor axis, have the general shape of an angle one side of the angle being substantially radial to the rotor and a second side inclined thereto. This apparatus is capable of both centripetal and centrifugal operation, and at concentrations of from 3 to 4%.

24 Claims, 10 Drawing Figures

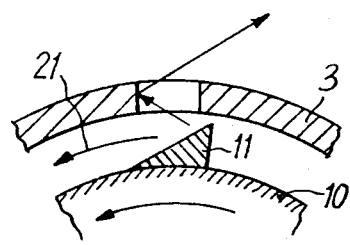
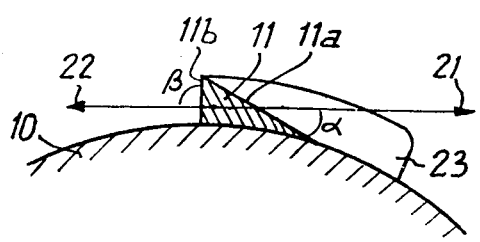
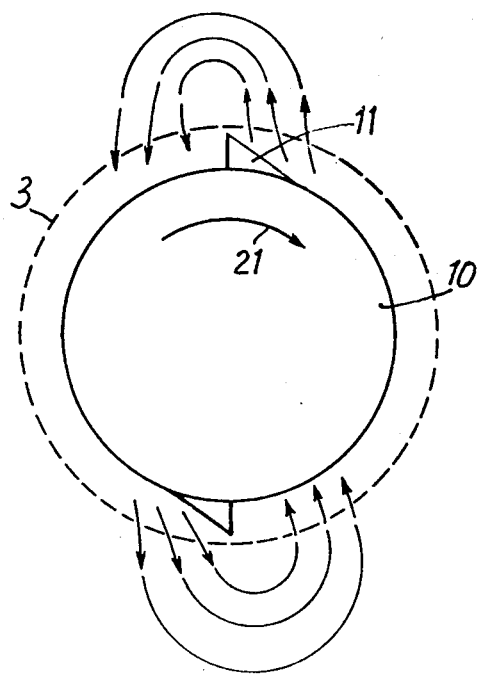
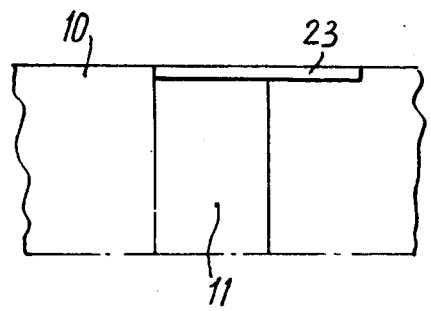
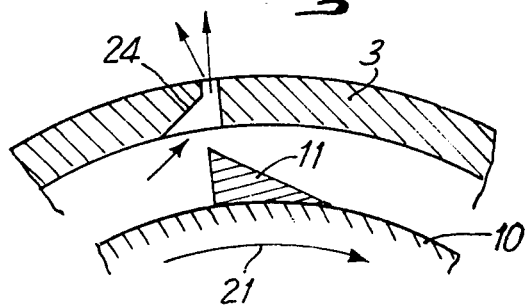

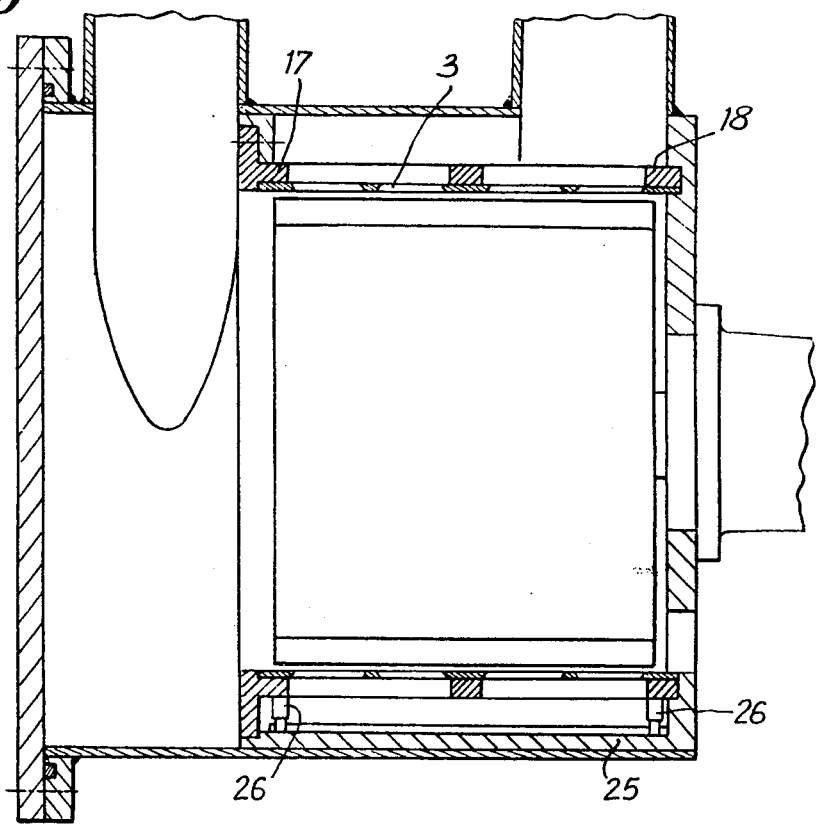
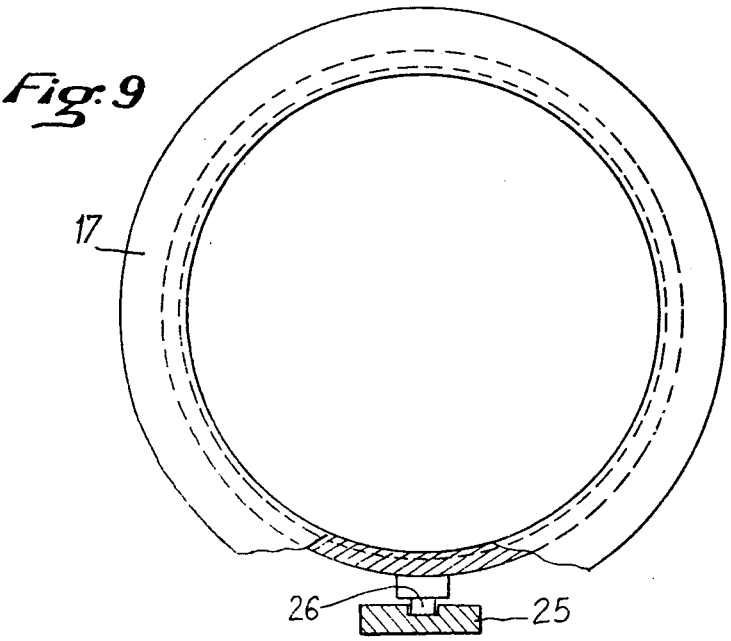

APPARATUS FOR THE PURIFICATION OF PAPER PULP

BACKGROUND OF THE INVENTION

The present invention relates to an apparatus intended for purifying paper pulp by screening it in the liquid state.

There are at present a very large number of apparatus assuming this function. They generally comprise:

a closed tank, a cylindrical screen inside this tank, the screen being pierced either by round holes or by elongated fine slits, a rotor having profiled blades which move in the vicinity of and along the surface of the screen at a suitable linear speed, nozzles for the admission of the crude pulp (unpurified), the evacuation of the purified pulp and the rejects stopped by the screen.

It may function either by centrifugal or by centripetal forces, depending on whether the pulp passes from the interior toward the exterior of the screen or in the reverse path.

Apparatus of this type are described in French Patent Nos. 1,271,054 and 1,546,515.

As the moving blades move in the liquid, they create around them zones of super pressure and reduced pressure which unclog the screen continuously owing to a to and fro movement of the liquid in its vicinity.

Without the continuous action of the rotor blades, the screen blocks immediately due to the accumulation of fibres and dirt on its surface. The unclogging blades are generally situated on the upstream face (in the direction of flow of the liquid) of the screen, that is to say, inside it for centrifugal operation and outside it for centripetal operation.

Centripetal apparatus in which the blades are situated on the downstream face of the screen, that is to say inside it, are however known. This last arrangement is particularly suitable when the openings in the screen are slits, and in this case it is already known that operation is improved by using slits having an asymmetrical clearing.

The dimensions of the perforations most generally used are from 1.5 to 2.5 mm in diameter for holes and from 0.25 to 0.7 mm in width for slits.

The concentration of the paper pulp (ratio of the weight of the dry fibres to the weight of water in the mixture) at which the known apparatus of this type utilising perforations of these sizes, function is generally low, of the order of 1%, and rarely exceeds 1.5 to 2%. The weakness of these concentrations is often inconvenient. In fact, in a scheme for the treatment of paper pulp, especially pulps obtained from old paper, it is of considerable interest to purify the pulp before refining it, that is to say to stop the contaminants before dividing them by refining. Now the minimum concentration for refining in a suitable manner is from 3 to 4%, and in density this demands the pulp after it has passed through purifiers, this operation often being expensive and cumbersome.

SUMMARY OF THE INVENTION

It is, therefore, of great interest to produce purifiers which are capable of operating at concentrations of from 3 to 4%, while at the same time making use of conventional perforations so as to obtain a high degree of purification even at relatively high concentrations and thus to allow immediate refining without a thickening operation. An apparatus of this type constitutes one of the objects of the present invention.

Moreover, it is known that it is worth sometimes operating with downstream blades (purification of granular particles using fine slits) and sometimes using upstream blades (purification of flat or elongated thin particles). It is another object of the invention to produce an apparatus which is capable both of centripetal and centrifugal operation.

An apparatus according to the invention comprises a closed tank containing at least one screen separating two chambers, said screen having a surface of revolution whose axis is the rotational axis of an internal rotor having a surface of revolution which is substantially parallel to that of the screen and having blades in the form of ridges of angular cross-section, one edge of which is directed approximately toward the axis while the other is inclined.

The rotor of the apparatus is capable of rotation in opposite directions, and means are provided for placing each chamber of the tank in communication, at will, with an inlet for crude pulp and an outlet for purified pulp.

The invention also relates to the following arrangements considered individually or in combination.

The means for placing the chambers in communication with the crude pulp inlet and the purified pulp outlet, comprise nozzles merging into the tank tangentially in the same rotational direction about the axis and this direction corresponds to the rotational direction of the rotor in which the face of the blades directed substantially radially towards the axis precedes the inclined face.

These nozzles communicate with the inlet for the crude pulp and the outlet for the purified pulp by means of valves, for example three-way valves.

These valves are coordinated with the rotational direction of the rotor so as to allow centripetal operation or centrifugal operation as desired.

In the case of centripetal operation, the rotational direction of the rotor is such that the inclined faces of the blades precede the faces directed toward the axis and vice versa in centrifugal operation.

The tank contains two reject pipes each communicating with one of the two chambers separated by the screen, these pipes being controlled by a valve or an equivalent arrangement.

The angle between the straight sections of the blades is of the order of 50° to 90°, the inclined face of each blade forming an angle of 20° to 30° with the tangent to the rotor on the straight side of the blade.

The rotor is cylindrical in shape, both ends being closed. The blades are arranged along the generatrices of the rotor.

The diameter of the rotor is in the range of from 70% to 85% of the diameter of the screen.

The ends of the blades comprise cheeks which are substantially perpendicular to the rotor axis.

The linear speed of the blades is of the order of 15 to 20 meters per second.

BRIEF DESCRIPTION OF THE DRAWINGS

These arrangements and all other features of the invention will be described in more detail with reference to the accompanying drawings, in which:

FIG. 4 illustrates the progress of the pulp as it passes through the screen.

FIGS. 5 and 6 illustrate partial views, respectively in section and in plan view, of the shape of the rotor blades;

FIG. 7 illustrates the probable path of certain current of liquid;

FIG. 8 illustrates a shape of screen slit for centripetal operation; and

FIGS. 9 and 10 illustrate a mode of assembling the screen.

DESCRIPTION OF THE PREFERRED EMBODIMENTS

Figure 1:
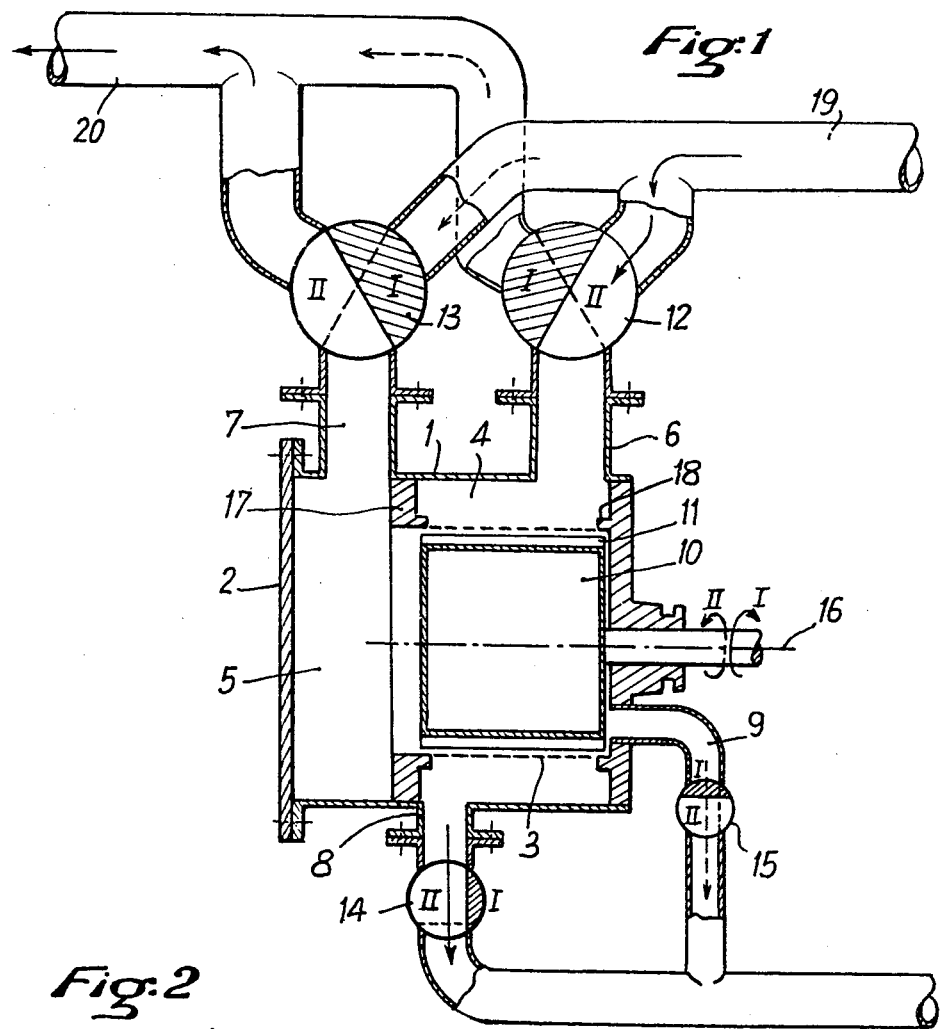
FIG. 1 is a diagrammatic view, in a vertical, and axial section, of an embodiment of the apparatus of the invention.

With reference to FIG. 1, it is seen that the apparatus comprises a tank 1 which is preferably closed by a detachable or opening lid 2. A screen 3 is located inside the tank 1 and has a surface of revolution which is preferably cylindrical and whose axis is denoted by numeral 16. The screen 3 is mounted inside the tank 1 in such a way that it defines and separates an external chamber 4 and an internal chamber 5. In the example shown, this is performed by mounting the screen 3 on terminal sleeves 17 and 18 in a sealed manner to the surface of the tank 1. The tank 1 is provided with two main nozzles 6 and 7 which are both connected to a source of crude pulp 19 and to a outlet for purified pulp 20 by means of three-way valves 12 and 13 or an equivalent arrangement. The valves 12 and 13 allow the chamber 4 and the chamber 5 to be placed selectively, at will, in communication with the inlet 19 and the outlet 20. They are coordinated by any suitable means in such a way that the chamber 4 communicates with the inlet 19 while the chamber 5 communicates with the outlet 20 and that while the chamber 5 communicates with the inlet 19, the chamber 4 communicates with the outlet 20.

It goes without saying that the valves 12 and 13 can be connected directly to the tanks or containers of crude pulp and of purified pulp by separate pipes.

The tank 1 also comprises two secondary or waste nozzles 8 and 9, one of which ends in the chamber 4 while the other ends in the chamber 5, which are intended to extract the rejects. The nozzle 8 is controlled by the valve 14 and the nozzle 9 by the valve 15.

A rotor 10 having axis 16 is located inside the screen 3, coaxially with the screen 3, rotated by any suitable means and bearing blades 11.

The rotor 10 has an external surface of revolution which is parallel to the surface of the screen 3 and which is preferably cylindrical so that the distance between the rotor and screen is substantially constant over its entire surface. The length of the rotor 10 along the axis 16 is approximately the same as that of the screen 3 and preferably slightly greater so that the ends of the rotor 10 extend beyond and cover those of the screen 3.

The blades 11 (see FIGS. 5 and 6) have two faces 11a and 11b at different inclinations. The face 11a is inclined at an angle $\alpha$ of the order of approximately 20° to 30°, to the wall of the rotor 10, while the face 11b is at an angle $\beta$, substantially perpendicular to this wall. The arrangement of the two faces 11a and 11b imparts to the blades the shape of ridges or projections on the surface of the rotor 10 having in the section perpendicular to the axis 16, the general shape of an angle, one side of which is directed approximately radially toward the axis 16 while the other side is inclined thereto, the value of the angle being preferably in the range of from approximately 50° to 90°.

The above-mentioned values are not strict. In particular, it is obvious that the angle between the face 11a and the tangent to the rotor 10 varies from one end of the blade to the other and is smaller at the foot of the blade than at its tip. In the context of the invention, it is sufficient for the values indicated to be substantially respected at one point of the blade 11 situated between its foot and its tip, or at a point in the area occupied by the blade on the rotor.

Figure 2:
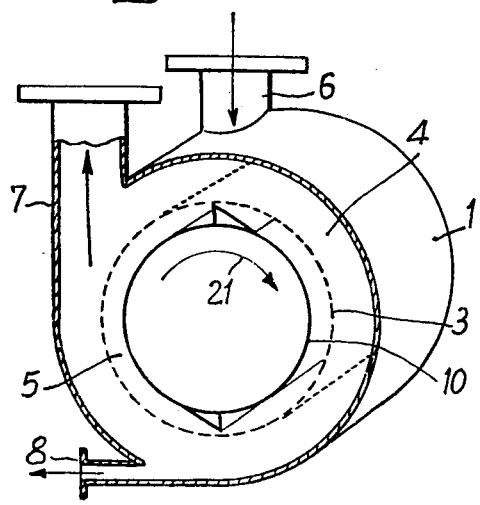
FIG. 2 is a diagrammatic illustration, in perspective, of the apparatus shown in FIG. 1 when operating centripetally.
Figure 3:
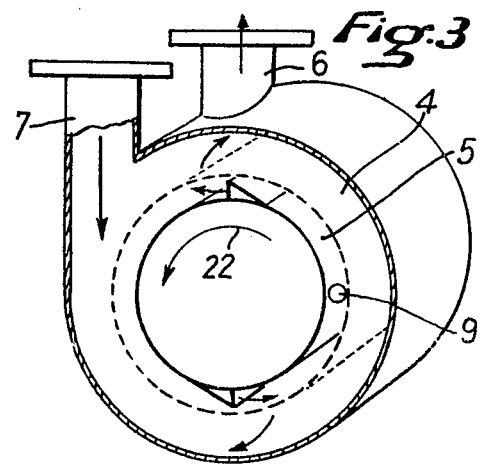
FIG. 3 is a diagrammatic illustration, in perspective, of the same apparatus as that shown in FIG. 1 when operating centrifugally.

The apparatus formed in this way is capable of both centripetal operation with the unclogging blades downstream of the screen (FIG. 2) and of centrifugal operation with the blades upstream of the screen (FIG. 3). FIGS. 2 and 3 are diagrammatic illustrations in which the wall 17 separating chambers 4 and 5 has not been shown.

During centripetal operation (FIG. 2) the crude pulp enters through the nozzle 6, flows round the screen 3 because of the tangential position of the nozzle 6, passes through the screen 3 and issues in purified form through the nozzle 7 situated tangentially in such a way that the flow is facilitated by the rotation of the pulp induced by the rotor. The waste which has been stopped by the screen 3 is discharged through the nozzle 8. This is the circuit indicated by the Roman Numerals II and the arrows in solid lines in FIG. 1.

The rotor turns in the direction of the arrow 21, that is to say, in such a way that the inclined faces 11a are in front of the faces 11b in relation to the direction of rotation.

As shown in FIG. 2, the nozzles 6 and 7 are both mounted so as to enter into the tank tangentially in the same rotational direction as the liquid which, in the example illustrated, is the rotational direction of the rotor 10 during centrifugal operation, that is to say the direction in which the face 11b of the blades 11 precedes the face 11a.

In the example illustrated, the nozzles 6 and 7 are parallel but another relative arrangement can be adopted.

During centrifugal operation (FIG. 3), the crude pulp arrives through the nozzle 7 and in rotating in the direction of rotation of the rotor, passes through the screen 3 and leaves through the nozzle 6. The rejects are discharged through the nozzle 9. This is the circuit indicated by the Roman Numerals I and the arrows in broken lines in FIG. 1. FIG. 1 also shows the rotational directions of the rotor 10 by means of the arrows marked with Roman Numerals I and II.

In both cases, it should be noted that the position of the nozzles and the rotational directions of the rotor are selected so that the speed communicated to the pulp by the rotor is always in the direction of flow of the pulp in the nozzles 6 and 7. This is seen in FIGS. 2 and 3 with regard to the nozzle 7 and the rotation of the pulp inside the screen 3.

However, this is also the case with respect to the nozzle 6 and the rotational direction of the pulp in the chamber 4 inside the screen 3. In fact, when the pulp rotates, under the influence of the rotor, in a certain direction inside the screen, it naturally turns in the opposite direction outside the same screen as a result of the rebound of the liquid thrown by the rotor on to the walls of the perforations in the screen. This is illustrated in FIG. 4 for centripetal operation. The apparatus thus allows the centripetal or centrifugal method to be used. In addition, it allows operation at concentrations which can be as high as 3 to 4%.

In fact, for centrigual operation, (arrow 22, FIGS. 3 and 5), the face 11b which is perpendicular to the movement creates a strong super-pressure which allows the thick pulp to pass through the screen, and acts as a form of scraper which provides good unclogging of the screen.

For centripetal operation (arrow 21, FIGS. 2 and 5), the inclined face acts as a vane of a centrifugal pump and sends a large volume of liquid through the perforations, thereby unclogging them. In addition, the face which is perpendicular to the movement causes a marked reduction in pressure downstream of the blade and this permits the pulp to pass in a high concentration.

The rotor 10 preferably has the shape of a cylinder which is closed at both ends and on which the blades 11 are disposed along the generatrices, the blades running from one end to the other of the cylinder. This arrangement defines a fairly large volume for liquid between the body of the rotor 10 and the screen 3 and, in the case of centripetal operation, this volume which is beaten by the blades 11 is, in a manner of speaking, forced to pass through the screen 3 from the interior to the exterior and then to pass from the exterior to the interior of the screen under the influence of the reduced pressure prevailing behind the blade. This to and fro movement of a large volume of liquid ensures that the screen is cleaned well and, moreover, acts as a vehicle for the fibres in the pulp so that the pulp does not pass through the screen at the high average concentration of 3 to 4% but at a lower concentration. This considerable internal recirculation of liquid explains the fact that very fine perforations can be used (width of 0.25 mm for slits and 1.5 mm for holes), even with a concentration of 4%.

The diameter of the rotor is preferably of the order of from 70% to 85% of the diameter of the screen so as to define a suitable volume of liquid between the rotor and screen.

The distance between the end of the blades and the screen will preferably be of the order of a maximum of 1 mm.

The apparatus according to the invention actually functions with screens having perforations which have the same characteristics as the known purifiers, that is to say, holes of from approximately 1.5 to 2.5 mm in diameter and slits of from 0.25 to 0.75 mm in width.

In order to increase the effects of super-pressure and reduced pressure described above, the invention also proposes that the ends of the blades 11 in the vicinity of the ends of the rotor 10 be provided with cheeks 23 (see FIG. 5). These cheeks have the shape of narrow ears situated in a plane which is approximately perpendicular to the axis 16. Similarly, to further increase these effects while remaining in a reasonable range of absorbed power, the invention proposes that speeds of travel for the blades be adopted above 15 m/second and preferably between 15 and 20 m/second. The speeds generally adopted are of the order of 10 m/second.

Moreover, in the case of centripetal operation with slits, openings having an asymmetrical clearance 24, FIG. 8, inclined in the direction opposite to the rotational direction 21 and which facilitates the passage of the liquid beaten by the blades will preferably be adopted in combination with the above.

The blades 11 can be two in number, extending over the entire length of the rotor 10 and diametrally opposed, as illustrated. However, the invention is not limited by this arrangement. Since the blades can be fairly numerous, it is also possible for them not to extend over the entire length of the rotor 10 but to be divided into blade sections preferably arranged so as to occupy the entire length of the rotor 10.

The apparatus illustrated has a horizontal axis. This arrangement is preferred but not essential and the axis may be inclined or even vertical.

The commutation of the valves 12, 13, 14, 15 and of the rotational direction of the rotor will preferably be coordinated by any suitable means, so as to avoid mistakes.

In the above description, the rejects are discharged in a continuous manner during purification and forms a thicker pulp which is treated in a secondary apparatus with a particular view to recycling.

The scope of the invention will not be departed from by extracting the rejects discontinuously between two phases of purification.

In order to install or remove the screens 3, the invention proposes that the lower part of the tank 1 be provided with rails 25 on which terminal sleeves 17, 18 can roll or slide, for example by means of guide studs 26. This arrangement is illustrated in FIGS. 9 and 10 and is particularly advantageous for large machines in which the screens 3 with their sleeves 17 and 18 are particularly heavy. The arrangement illustrated allows the screen 3 to be extracted by sliding over a sufficient length to allow it to be taken up by an overhead crane.

Various alternative modes of production can be adopted without departing from the scope of the invention. In particular, the nozzles 6, 7 can be provided with branches controlled by separate valves instead of a single valve 12, 13 on each nozzle 6, 7 etc.

What is claim is:

1. An apparatus for purifying paper pulp by screening in the liquid state, said apparatus comprising a tank containing at least one fixed screen defining a first and a second chamber, the surface of said screen being a surface of revolution about an axis, said axis being the rotational axis of a rotor disposed inside the screen, said rotor having a surface of revolution substantially parallel to said surface of revolution of the screen, and having longitudinal blades disposed thereon, said blades having, in a section transverse to the axis, the general shape of an angle, one face of the blades being directed approximately radially towards the axis and the other face being inclined thereto, and first nozzle means for placing the tank in communication with a crude pulp inlet source or an outlet for purified pulp, said first nozzle means merging the crude pulp into the tank in a direction generally tangential to the direction of rotation of the rotor.

2. An apparatus according to claim 1, in which the distance between the blades and the screen is equal to or less than approximately 1 mm.

3. An apparatus according to claim 1, in which the blades are configured and the rotor is rotated at a speed such 15 to 20 meters per second.

4. An apparatus according to claim 1, in which the angle at the tip of the blade section, to the rotational axis is in the range of from about 50° to about 90°.

5. An apparatus according to claim 1, in which the inclined face of each blade forms an angle in the range of from about 20° to about 30° with a tangent to the surface of the rotor at a point in the zone occupied by the said blade on the rotor.

6. An apparatus according to claim 1, in which the rotor is cylindrical in shape and has closed ends and the screen is cylindrical and of circular cross-section.

7. An apparatus according to claim 1, further comprising second nozzle means for placing the tank in communication with a purified pulp outlet, said second nozzle means also merging into the tank generally tangentially in the same rotational direction of the rotor about the axis.

8. An apparatus according to claim 7, in which the merging directions of the two nozzle means corresponds to the rotational direction of the rotor in which the blade face directed substantially radially toward the axis precedes the inclined face.

9. An apparatus according to claim 7, in which the rotor is capable of rotating in opposite directions, and means for placing said first and second chambers in communication, selectively with an inlet for crude pulp and a reject nozzle, or with an outlet for purified pulp to accord with the rotational direction selected.

10. An apparatus according to claim 9, in which centripetal operation is obtained by rotation of the rotor so that the inclined faces precede the face substantially radial to the axis in the direction of rotation, the first chamber located outside the screen communicating with both a source of crude pulp and the reject nozzle, and the second chamber communicating with the outlet for purified pulp.

11. An apparatus according to claim 9, in which centrifugal operation is obtained by rotation of the rotor so that the faces of the blades substantially radial to the axis precede the inclined faces in the direction of rotation, the first chamber outside the screen communicating with the outlet for purified pulp while the second chamber inside the screen communicates with the inlet for crude pulp and the reject nozzle.

12. Apparatus according to claim 9, in which the first and second chambers are each provided with a single nozzle in communication with both a crude pulp inlet and a purified pulp outlet, each nozzle being provided with a three-way valve to provide communication between the first chamber and the crude pulp inlet and the second chamber and the purified pulp output or vice versa.

13. An apparatus according to claim 12, in which the first chamber and second chamber each comprise a reject nozzle controlled by valve means capable of being coordinated with the three-way valves.

14. An apparatus according to claim 12, in which means are provided for coordinating a change in rotational direction of the rotor with the control of the three-way valve, thereby placing one of the chambers in communication with the crude pulp inlet and the other chamber in communication with the purified pulp outlet in accord with the rotational direction.

15. An apparatus according to claim 1, in which the blades are disposed along the generatrices of the rotor and extend over the entire length thereof.

16. An apparatus according to claim 1, in which the rotor includes two diametrally opposed blades.

17. An apparatus according to claim 1, in which the length and location of the rotor is such that it passes slightly beyond the ends of the screen.

18. An apparatus according to claim 1, the diameter of the rotor is in the range of from about 70% to about 85% of the diameter of the screen.

19. An apparatus according to claim 1, in which the screen has perforations in the form of holes, the holes having a diameter of from about 1.5 to about 2.5 mm.

20. An apparatus as in claim 1 in which the screen has perforation in the form of slits having a width of from about 1.5 to about 2.5 mm.

21. An apparatus according to claim 20, in which for centripetal operation, the screen has slits having an asymmetrical clearance on the side of the screen adjacent the blades, the clearance being inclined in the direction opposite to the rotational direction of the rotor.

22. An apparatus for purifying paper pulp by screening in the liquid state, said apparatus comprising a tank containing at least one fixed screen defining a first and second chamber, the surface of said screen being a surface of revolution about an axis, said axis being the rotational axis of a rotor disposed inside the screen, said rotor having a surface of revolution substantially parallel to said surface of revolution of the screen, and having longitudinal blades disposed thereon, said blades having, in a section transverse to the axis, the general shape of an angle, one face of the blades being directed approximately radially towards the axis and the other face being inclined thereto, the ends of said blades also having cheeks thereon in the vicinity of the rotor ends.

23. An apparatus for purifying paper pulp by screening in the liquid state, said apparatus comprising a tank containing at least one fixed screen defining a first and a second chamber, the surface of said screen being a surface of revolution about an axis, said axis being the rotational axis of a rotor disposed inside the screen, rails on the wall of said tank on which the screen can travel by means of guiding studs, said rotor having a surface of revolution substantially parallel to said surface of revolution of the screen, and having longitudinal blades disposed thereon, said blades having, in a section transverse to the axis, the general shape of an angle, one face of the blades being directed approximately radially towards the axis and the other face being inclined thereto.

24. An apparatus for purifying paper pulp by screening in the liquid state, said apparatus comprising a tank containing at least one fixed screen defining a first and a second chamber, the surface of said screen being a surface of revolution about an axis, said axis being the rotational axis of a rotor disposed inside the screen, said rotor having a surface of revolution substantially parallel to said surface of revolution of the screen, and having longitudinal blades disposed thereon, said blades having, in a section transverse to the axis, the general shape of an angle, one face of the blades being directed approximately radially towards the axis and the other face being inclined thereto, the distance between the tip of a blade and the screen being equal to or less than approximately 1 mm.

* * * * *